(12) United States Patent
Takahata et al.

(10) Patent No.: US 9,312,559 B2
(45) Date of Patent: Apr. 12, 2016

(54) NONAQUEOUS ELECTROLYTE SECONDARY BATTERY PROVIDED WITH A WOUND ELECTRODE BODY

(75) Inventors: Koji Takahata, Toyota (JP); Toshihiko Mitsuhashi, Toyota (JP); Naoyuki Wada, Osaka (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 440 days.

(21) Appl. No.: 13/825,374

(22) PCT Filed: Sep. 22, 2010

(86) PCT No.: PCT/JP2010/066442
§ 371 (c)(1),
(2), (4) Date: Mar. 21, 2013

(87) PCT Pub. No.: WO2012/039041
PCT Pub. Date: Mar. 29, 2012

(65) Prior Publication Data
US 2013/0177792 A1 Jul. 11, 2013

(51) Int. Cl.
*H01M 4/02* (2006.01)
*H01M 4/133* (2010.01)
(Continued)

(52) U.S. Cl.
CPC .......... *H01M 10/0431* (2013.01); *H01M 4/133* (2013.01); *H01M 4/1393* (2013.01); *H01M 4/587* (2013.01); *H01M 4/622* (2013.01); *H01M 4/623* (2013.01); *H01M 4/661* (2013.01); *H01M 4/70* (2013.01); *H01M 10/0587* (2013.01); *H01M 4/505* (2013.01); *H01M 4/525* (2013.01); *H01M 4/625* (2013.01); *H01M 2004/021* (2013.01); *Y02E 60/122* (2013.01)

(58) Field of Classification Search
CPC .............................. H01M 4/661; H01M 4/662
See application file for complete search history.

(56) References Cited

U.S. PATENT DOCUMENTS

2002/0090544 A1   7/2002 Fujita et al.
2004/0072076 A1   4/2004 Matsubara et al.
(Continued)

FOREIGN PATENT DOCUMENTS

CN   1767253      5/2006
CN   101572330    11/2009
(Continued)

*Primary Examiner* — Maria J Laios
*Assistant Examiner* — Robert S Carrico
(74) *Attorney, Agent, or Firm* — Finnegan, Henderson, Farabow, Garrett & Dunner, LLP

(57) ABSTRACT

A main object of the present invention to provide a nonaqueous electrolyte secondary battery having high durability towards charge and discharge cycles, by preventing buckling of a wound electrode body. The secondary battery provided by the present invention comprises: a nonaqueous electrolyte; and a wound electrode body 80 configured by superposing on each other, and winding a positive electrode sheet 10 having a positive electrode collector formed to a sheet shape and a positive electrode active material layer formed on that collector, a, negative electrode sheet 20 having a negative electrode collector formed to a sheet shape and a negative electrode active material layer formed on that collector, and a separator 40 formed to a sheet shape. The negative electrode active material contained in the negative electrode active material layer is oriented in a predetermined direction. The positive electrode sheet 10, negative electrode sheet 20 and separator sheet 40 all have a tensile elongation at break of 2% or higher.

10 Claims, 14 Drawing Sheets

(51) Int. Cl.
  *H01M 4/1393* (2010.01)
  *H01M 4/587* (2010.01)
  *H01M 4/66* (2006.01)
  *H01M 4/70* (2006.01)
  *H01M 10/04* (2006.01)
  *H01M 10/0587* (2010.01)
  *H01M 4/62* (2006.01)
  *H01M 4/505* (2010.01)
  *H01M 4/525* (2010.01)

(56) References Cited

U.S. PATENT DOCUMENTS

2005/0069767 A1* 3/2005 Tsunekawa et al. ........... 429/209
2005/0142440 A1* 6/2005 Yamaki et al. ................. 429/209
2006/0062717 A1* 3/2006 Tokuoka et al. ............... 423/448
2009/0274951 A1 11/2009 Kinoshita et al.
2010/0068627 A1 3/2010 Muraoka et al.
2011/0287288 A1 11/2011 Hina et al.

FOREIGN PATENT DOCUMENTS

| | | |
|---|---|---|
| JP | 11-273743 | 10/1999 |
| JP | 2001-189167 | 7/2001 |
| JP | 2003-197182 | 7/2003 |
| JP | 2004-220926 | 8/2004 |
| JP | 2009-64770 | 3/2009 |
| JP | 2009-266761 | 11/2009 |
| JP | 4366451 | 11/2009 |
| WO | WO 2009019861 A1 * | 2/2009 |

* cited by examiner

F I G. 12
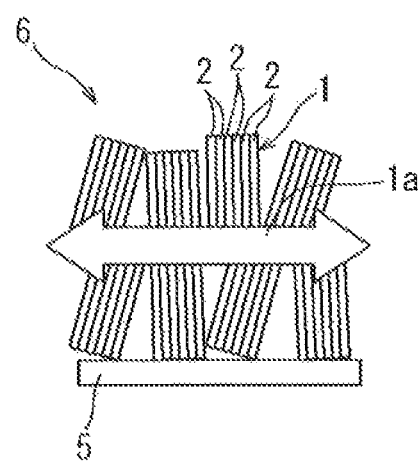

NONAQUEOUS ELECTROLYTE SECONDARY BATTERY PROVIDED WITH A WOUND ELECTRODE BODY

CROSS-REFERENCE TO RELATED APPLICATIONS

This application is a national phase application of International Application No. PCT/JP2010/066442, filed Sep. 22, 2010, the content of which is incorporated herein by reference.

TECHNICAL FIELD

The present invention relates to a nonaqueous electrolyte secondary battery, and more particularly, to a nonaqueous electrolyte secondary battery provided with a wound electrode body resulting from winding a positive electrode sheet and a negative electrode sheet with a separator sheet interposed therebetween.

BACKGROUND ART

Recent years have witnessed the growing importance of nonaqueous electrolyte secondary batteries, for instance lithium secondary batteries and nickel hydride batteries, as vehicle-mounted power sources, and as power sources that are provided in, for instance, personal computers and portable terminals. In particular, lithium secondary batteries, which are lightweight and afford high energy density, are expected to be used as preferred high-output power sources installed in vehicles. In lithium secondary batteries, charge and discharge take place through exchange of Li ions between a positive electrode and a negative electrode.

In a typical configuration of such lithium ion batteries, the battery is provided with an electrode body (wound electrode body) having a structure wherein sheet-shaped electrodes are wound spirally. Such a wound electrode body is formed by winding, to a spiral shape, a negative electrode sheet in which a negative electrode active material layer containing a negative electrode active material is held on both faces of a negative electrode collector, and a positive electrode sheet in which a positive electrode active material layer containing a positive electrode active material is held on both faces of a positive electrode collector, with a separator sheet interposed in between.

Examples of the negative electrode collector used in the negative electrode include, for instance, a sheet-shaped or foil-like member having copper or a copper alloy as a main constituent. Examples of the negative electrode active material that is used in the negative electrode include, for instance, a graphite material such as natural graphite. As illustrated in FIG. 9, such graphite has a layered structure, and is formed through stacking of multiple layers in each of which carbon atoms are planarly spread forming a network structure. During charging, Li ions intrude through edge faces (faces resulting from layer superposition) 3 of layers 2, and diffuse between the layers. During discharge, Li ions can be released through the edge faces 3 of the layers 2. The electric resistivity of graphite 1 is lower in the surface direction of the layers than in the stacking direction of the layers. As a result, there forms a conduction path 4 of detoured electrons along the surface direction of the layers.

Technologies have been proposed that involve magnetically orienting the graphite that is used in such lithium secondary batteries. For instance, Patent Literature 1 discloses the feature of imparting orientation in such a manner that the (002) plane of graphite becomes substantially perpendicular to a collector 5, in a magnetic field, followed by solidification, during formation of a negative electrode. In this case, as illustrated in FIG. 10, the edge faces 3 of the layers 2 become oriented towards the positive electrode; as a result, Li ions become intercalated and deintercalated smoothly while the conduction path 4 of electrons becomes shorter. Therefore, this allows enhancing the electron conductivity of a negative electrode sheet 6.

CITATION LIST

Patent Literature

Patent Literature 1: Japanese Patent Application Publication No. 2003-197182

SUMMARY OF INVENTION

However, a lithium secondary battery provided with a wound electrode body having thus magnetically oriented graphite was problematic in that the wound electrode body experienced buckling (wrinkling, sagging, curving and the like), upon repeated charging and discharging, and performance was impaired.

In the light of the above, it is a main object of the present invention to provide a nonaqueous electrolyte secondary battery having high durability towards charge and discharge cycles, by preventing the abovementioned buckling of a wound electrode body.

The inventors of the present application have been working on the development of a nonaqueous electrolyte secondary battery provided with a wound electrode body having a magnetically oriented negative electrode active material, and have come upon the problem of buckling in the wound electrode body, and performance degradation, that occur when the battery is subjected to charge and discharge cycles. Such cycle degradation was not observed in batteries that use a negative electrode active material that is not magnetically oriented. Therefore, the inventors conducted diligent research on the reason why cycle degradation occurred only in batteries that use a magnetically oriented negative electrode active material, despite the fact that the constituent materials of the battery are not all that different.

Specifically, the crystal size of the negative electrode active material changes accompanying intercalation/deintercalation of Li ions, and expands and contracts to some degree. As illustrated in FIG. 11, the particles of negative electrode active material 1 are oriented in random directions in batteries constructed using a negative electrode active material 1 that is not magnetically oriented. Therefore, the negative electrode active material is not readily affected by expansion and contraction 7 that accompanies charge and discharge. In a battery constructed using a negative electrode active material 1 that is magnetically oriented, however, the directions of expansion and contraction 7 accompanying charge and discharge are identical, as illustrated in FIG. 12, and, as a result, expansion and contraction of the negative electrode active material layer is greater. In consequence, the positive electrode sheet, the negative electrode sheet and the separator sheet fail to stretch to conform to the negative electrode active material layer that is trying to expand, and buckling occurs in the wound electrode body (FIG. 13). This phenomenon may give rise to uneven reactions in the wound electrode body and may be a cause of performance degradation.

The inventors found that in a nonaqueous electrolyte secondary battery provided with a wound electrode body having the abovementioned magnetically oriented negative electrode active material, such buckling of the wound electrode body could be suppressed and the durability towards charge and discharge cycles could be effectively improved, when varying the tensile elongation at break of the positive electrode sheet, the negative electrode sheet and the separator sheet. Specifically, the inventors found a correlation between the tensile elongation at break of the positive electrode sheet, the negative electrode sheet and the separator sheet, and capacity after a charge and discharge cycle test, and found an appropriate range of tensile elongation at break for which capacity is not impaired even upon charge and discharge cycling. The present invention was thus arrived at on the basis of those findings.

Specifically, the secondary battery provided by the present invention comprises; a nonaqueous electrolyte; and a wound electrode body configured by superposing on each other, and winding a positive electrode sheet having a positive electrode collector formed to a sheet shape and a positive electrode active material layer formed on that collector, a negative electrode sheet having a negative electrode collector formed to a sheet shape and a negative electrode active material layer formed on that collector, and a separator formed to a sheet shape. The negative electrode active material contained in the negative electrode active material layer is oriented in a predetermined direction, and the positive electrode sheet, the negative electrode sheet and the separator sheet all have a tensile elongation at break of 2% or higher. The tensile elongation at break in all of the positive electrode sheet, the negative electrode sheet and the separator sheet is appropriately 2M % or higher, but preferably 3.0% or higher, and particularly preferably 4.0% or higher.

The positive electrode sheet, the negative electrode sheet and the separator sheet that satisfy such a value of tensile elongation at break exhibit better elongation properties than in conventional instances, and hence the sheets can stretch so as to conform to expansion and contraction of the negative electrode sheet accompanying charge and discharge. As a result, buckling of the wound electrode body can be properly prevented by using a positive electrode sheet, a negative electrode sheet and a separator sheet that satisfy such a value of tensile elongation at break. By virtue of such a feature, it becomes possible to prevent buckling of the wound electrode body, despite the large expansion and contraction of the negative electrode sheet due to magnetic orientation, and there can be provided a nonaqueous electrolyte secondary battery having high durability towards charge and discharge cycles.

For instance, rectangular test pieces are cut out of each sheet, and each test piece is pulled at a constant rate in the longitudinal direction. The abovementioned tensile elongation at break can then be worked out, for instance, in accordance with Expression (1) below, where $X0$ denotes the distance (length in the test-piece flat section that constitutes the reference for elongation measurement) between two gauge marks at the point in time where the load starts acting on the test piece, and $X1$ denotes the distance between the two gauge marks at the point in time where the test piece breaks.

$$\text{Tensile elongation at break} = [(X1-X0)/X0] \times 100 \quad (1)$$

In a preferred mode of the nonaqueous electrolyte secondary battery disclosed herein, the tensile elongation at break of at least one of the positive electrode sheet and the negative electrode sheet is 4% or higher. Buckling of the wound electrode body can be prevented more reliably by setting the tensile elongation at break of at least one of the positive electrode sheet and the negative electrode sheet to be 4% or higher.

In a preferred mode of the nonaqueous electrolyte secondary battery disclosed herein, the oriented negative electrode active material is graphite. In this case, the graphite contained in the negative electrode active material layer is preferably present in a state where the peak intensity ratio of the (110) plane and the (004) plane of the graphite, by X-ray diffraction, is 0.5 or greater. For instance, the intensity ratio of the {(110)/(004)} planes by X-ray diffraction where X-rays are caused to strike the surface of the negative electrode active material layer, as a measurement surface, is appropriately 0.5 or greater, but more preferably 0.7 or greater, yet more preferably 1.4 or greater and particularly preferably 2.0 or greater. In this case, the layer faces of graphite are strongly oriented substantially perpendicularly to the negative electrode collector, and hence the conduction paths of electrons become shorter, and the electron conductivity of the negative electrode sheet can be enhanced. Therefore, the battery resistance of the lithium secondary battery can be reduced by using, as the negative electrode active material, graphite oriented at a peak intensity ratio such as the above-described one. In such a case, expansion and contraction at the surface direction of the negative electrode sheet are particularly large, and hence the effect elicited by the feature of the present invention, namely preventing buckling of the wound electrode body by virtue the feature of satisfying the abovementioned value of tensile elongation at break, can be brought out particularly well. Preferably, the oriented negative electrode active material is oriented in a predetermined direction through magnetic orientation.

In a preferred mode of the nonaqueous electrolyte secondary battery disclosed herein, the negative electrode collector is an electrolytic copper foil having a thickness of 10 μm or greater. The ductility of an electrolytic copper foil is higher than that of a rolled copper foil, and hence an appropriate negative electrode sheet that satisfies the abovementioned values of tensile elongation at break (for instance, 2% or higher, preferably 2.5% or higher, and particularly preferably 2.7% or higher) can be achieved by using the abovementioned electrolytic copper foil as the negative electrode collector. The thickness of the collector can be selected as appropriate, in accordance with the intended application, but ordinarily good elongation properties are obtained at a thickness of 10 μm or greater (for instance, 10 to 25 μm, or greater), preferably 15 μm or greater, more preferably 20 μm or greater and particularly preferably 25 μm or greater. If the negative electrode collector is too thick, however, energy density may decrease, and the performance of the battery may be impaired. From the viewpoint of balancing energy density and elongation properties, the thickness of the negative electrode collector ranges preferably from about 10 to 20 μm.

In a preferred mode of the nonaqueous electrolyte secondary battery disclosed herein, the negative electrode sheet is formed by press-forming of the negative electrode active material layer onto the negative electrode collector, followed by a thermal treatment. When the negative electrode active material layer is press-formed, the negative electrode collector experiences work hardening on account of the forming pressure, and, as a result, the tensile elongation at break of the negative electrode sheet may tend to drop. In such a case as well, softening can be elicited in the negative electrode collector, and the tensile elongation at break of the negative electrode sheet can be increased, by performing a thermal treatment after pressing.

In a preferred mode of the nonaqueous electrolyte secondary battery disclosed herein, the positive electrode collector is a JIS 1000-series or 8000-series aluminum foil. Aluminum foil of the 1000-series or 8000-series, of pure aluminum grade, has high ductility, and hence an appropriate positive electrode sheet that satisfies the abovementioned values of tensile elongation at break (for instance, 2% or higher, preferably 2.2% or higher and particularly preferably 2.5% or higher) can be achieved by using that aluminum foil as the positive electrode collector. The thickness of the collector can be selected as appropriate, in accordance with the intended application, but ordinarily good elongation properties are obtained at a thickness of 15 μm or greater (for instance, 15 to 40 μm, or greater), preferably 20 μm or greater, more preferably 30 μm or greater and particularly preferably 40 μm or greater. If the positive electrode collector is too thick, however, energy density may decrease, and the performance of the battery may be impaired. From the viewpoint of balancing energy density and elongation properties, the thickness of the positive electrode collector ranges preferably from about 15 to 25 μm.

In a preferred mode of the nonaqueous electrolyte secondary battery disclosed herein, the positive electrode sheet is formed by press-forming of the positive electrode active material layer onto the positive electrode collector, followed by a thermal treatment. When the positive electrode active material layer is press-formed, the positive electrode collector experiences work hardening on account of the forming pressure, and, as a result, the tensile elongation at break of the positive electrode sheet may tend to drop. In such a case as well, the tensile elongation at break of the positive electrode sheet can be increased by performing a thermal treatment after pressing.

In a preferred mode of the nonaqueous electrolyte secondary battery disclosed herein, there is provided an outer case having an inner space with a shape corresponding to that of the wound electrode body, and the wound electrode body is disposed in the inner space so as not to come into contact with an inner wall of the outer case. The wound electrode body thus disposed so as not to come into contact with the inner wall of the outer case buckles readily, and hence it is particularly useful to use a configuration that satisfies the abovementioned values of tensile elongation at break.

In such a nonaqueous electrolyte secondary battery, buckling of the wound electrode body is properly prevented, and the battery exhibits good durability towards charge and discharge cycles; hence, the battery is appropriate as a battery installed in vehicles such as automobiles. Accordingly, the present invention provides also a vehicle that comprises any one of the nonaqueous electrolyte secondary batteries disclosed herein (which may be in the form of a battery pack of nonaqueous electrolyte secondary batteries connected to each other). In particular, the present invention provides a vehicle (for instance, an automobile) equipped with the nonaqueous electrolyte secondary battery as a source of power (typically, a source of power in a hybrid vehicle or electric vehicle).

BRIEF DESCRIPTION OF DRAWINGS

FIG. 12 is a cross-sectional diagram illustrating schematically a negative electrode sheet having a magnetically oriented active material (for instance, graphite);

DESCRIPTION OF EMBODIMENTS

Figure 1:
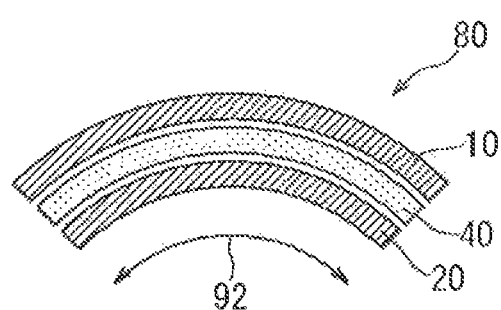
FIG. 1 is a cross-sectional diagram illustrating schematically a relevant portion of a wound electrode body according to an embodiment of the present invention.

Embodiments of the present invention are explained below with reference to accompanying drawings. In the drawings below, members and sites that elicit identical effects are denoted with identical reference numerals. The dimensional relationships (length, width, thickness and so forth) in the figures do not reflect actual dimensional relationships. Any features other than the features specifically set forth in the present description and which may be necessary for carrying out the present invention (for instance, the production method of a separator and an electrolyte, as well as ordinary techniques relating to the construction of nonaqueous electrolyte secondary batteries) can be regarded as instances of design matter for a person skilled in the art on the basis of known techniques in the technical field in question.

Although not meant to be limited particularly thereto, the present invention will be explained next in the form of an example of a nonaqueous electrolyte lithium secondary battery (lithium ion battery) in which a electrode body that is wound (wound electrode body) and a nonaqueous electrolyte are accommodated in a cylindrical-type outer case.

Figure 2:
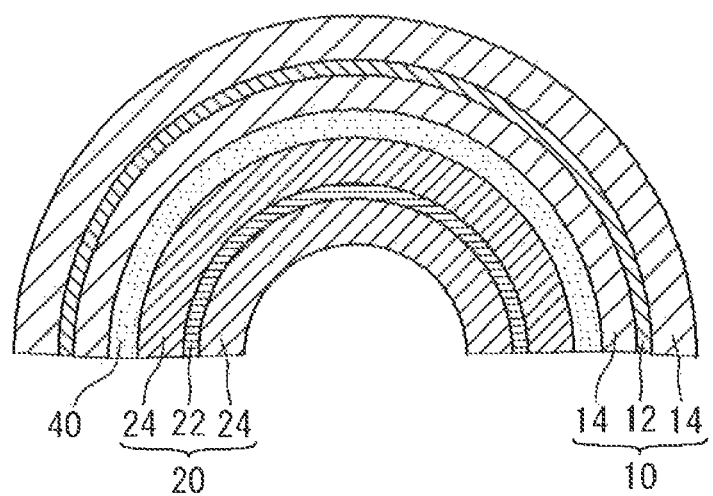
FIG. 2 is a cross-sectional diagram illustrating schematically a relevant portion of a wound electrode body according to an embodiment of the present invention.

As illustrated in FIG. 1, the secondary battery provided by the present invention is a nonaqueous electrolyte lithium secondary battery provided with a wound electrode body 80 having a magnetically oriented negative electrode active material. As illustrated in FIG. 2, the nonaqueous electrolyte lithium secondary battery has a nonaqueous electrolyte (not shown); and a wound electrode body 80 that is formed by superposing on each other, and winding a positive electrode sheet 10 having a positive electrode collector 12 formed to a sheet shape and a positive electrode active material layer 14 formed on the collector 12; a negative electrode sheet 20 having a negative electrode collector 22 formed to a sheet shape and a negative electrode active material layer 24 formed on the collector 22; and a separator 40 that is formed to a sheet shape. The negative electrode active material contained in the negative electrode active material layer 24 is oriented in a predetermined direction through magnetic orientation. As a characterizing feature, the tensile elongation at break in all of the positive electrode sheet 10, the negative electrode sheet 20 and the separator sheet 40 is 2% or higher. The tensile elongation at break in all of the positive electrode sheet, the negative electrode sheet and the separator sheet is appropriately 2% or higher, but in a preferably 3.0% or higher, and particularly preferably 4.0% or higher.

The positive electrode sheet 10, negative electrode sheet 20 and separator sheet 40 that satisfy such a value of tensile elongation at break exhibit better elongation properties than in conventional instances, and hence the sheets can stretch so as to conform to expansion and contraction of the negative electrode sheet accompanying charge and discharge. As a result, budding of the wound electrode body 80 can be properly prevented by using a positive electrode sheet, a negative electrode sheet and a separator sheet that satisfy such a value of tensile elongation at break. By virtue of such a feature, it becomes possible to prevent buckling of the wound electrode body, despite the large expansion and contraction of the negative electrode sheet due to magnetic orientation, and it becomes possible to provide a lithium secondary battery of high durability towards charge and discharge cycles.

For instance, the tensile elongation at break of the positive electrode sheet, the negative electrode sheet and the separator sheet provided by the present invention is a tensile elongation at break that preferably satisfies 2.0% or higher, more preferably that satisfies 2.5% or higher, yet more preferably that satisfies 3.0% or higher, even yet more preferably that satisfies 3.5% or higher, and particularly preferably that satisfies 4.0% or higher. However, a positive electrode sheet and negative electrode sheet having a value of tensile elongation at break that exceeds 5% become difficult to produce, and, in addition, demand a weaker pressing pressure in a below-described pressing process. Therefore, the density of the active material layer may drop and, accordingly, a conductive network may fail to form, and resistance may increase. From the viewpoint of preventing increases in resistance, the value of tensile elongation at break of the positive electrode sheet and the negative electrode sheet satisfies preferably 2.0 to 5% (in particular, 2.5 to 5%). For instance, a value of tensile elongation at break of 2.0 to 5% (in particular, 2.5 to 5%) in the positive electrode sheet and the negative electrode sheet is appropriate in terms of preventing both buckling of the wound electrode body and increases in resistance.

As illustrated schematically in FIG. 2, the negative electrode sheet 20 disclosed herein can be formed by providing the negative electrode active material layer 24, having a main component in the form of a negative electrode active material for lithium secondary batteries, on both faces of the elongated negative electrode collector 22. A copper foil, or another metal foil appropriate for negative electrodes, is suitably used in the negative electrode collector 22.

As described above, the negative electrode sheet 20 disclosed herein has a predetermined value of tensile elongation at break. One appropriate condition for realizing such a tensile elongation at break may involve a method of selecting properly the material and the thickness of the negative electrode collector 22 contained in the negative electrode sheet 20. Preferably, for instance, the material of the negative electrode collector 22 is an electrolytic copper foil. The ductility of an electrolytic copper foil is higher than that of a rolled copper foil, and hence an appropriate negative electrode sheet 20 that satisfies the abovementioned values of tensile elongation at break (for instance, 2% or higher, preferably 2.5% or higher, and particularly preferably 2.7% or higher) can be achieved by using the abovementioned electrolytic copper foil as the negative electrode collector 22. The thickness of the negative electrode collector can be selected as appropriate, in accordance with the intended application, but ordinarily good elongation properties are obtained at a thickness of 10 µm or greater (for instance, 10 to 25 µm, or greater), preferably 15 µm or greater, more preferably 20 µm or greater and particularly preferably 25 µm or greater. If the negative electrode collector is too thick, however, energy density may decrease, and the performance of the battery may be impaired. From the viewpoint of balancing energy density and elongation properties, the thickness of the negative electrode collector ranges preferably from about 10 to 20 µm.

As the negative electrode active material contained in the negative electrode active material layer 24 there can be used various materials that can function as a negative electrode active material of lithium secondary batteries (i.e. materials capable of reversibly storing and releasing Li ions (typically, capable of having lithium ions intercalated and deintercalated to/from the material)) and that can be oriented in a predetermined direction through magnetic orientation. As the negative electrode active material there can be used, for instance, one, two or more types of substances that are used in conventional lithium secondary batteries and that can be oriented in a predetermined direction through magnetic orientation.

Examples of preferred materials for applying the technology disclosed herein include, for instance, negative electrode active materials having, as a main component, a graphite material such as natural graphite, artificial graphite, pyrolytic graphite or the like. Among the foregoing, the technology disclosed herein is preferably applied to negative electrode active materials having natural graphite (or artificial graphite) as a main component (typically, a negative electrode active material comprising substantially natural graphite (or artificial graphite)). Such graphite may result from spheroidization of flake graphite. For instance, there can be preferably used a negative electrode active material in the form of spheroidized natural graphite (or spheroidized artificial graphite) having an average particle size ranging from about 5 µm to 15 µm.

Embodiments of the present invention will be explained in detail on the basis of a main example of an instance where the present invention is used in a lithium secondary battery that relies on a negative electrode active material substantially made up of a powder having graphite as a main component (graphite powder), but that embodiment is not meant to limit in any way the range of target applications of the present invention.

The graphite powder contained in the negative electrode active material layer disclosed herein is preferably present in a state where a peak intensity ratio of the (110) plane and the (004) plane of the graphite powder, by X-ray diffraction, is 0.5 or greater. For instance, the intensity ratio of the {(110)/(004)} planes by X-ray diffraction where X-rays are caused to strike the surface of the negative electrode active material layer, as a measurement surface, is appropriately 0.5 or greater, but more preferably 0.7 or greater, yet more preferably 1.4 or greater and particularly preferably 2.0 or greater.

Figure 3:
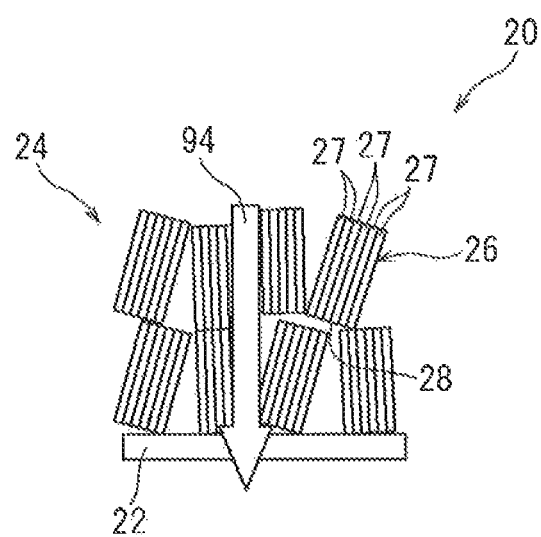
FIG. 3 is a cross-sectional diagram illustrating schematically a relevant portion of a negative electrode sheet according to an embodiment of the present invention.

When the peak intensity ratio of the (110) plane and the (004) plane is 0.5 or greater, layer faces 27 of graphite 26 become strongly oriented so as to be substantially perpendicular to the negative electrode collector 22, as illustrated in FIG. 3. In this case, edge faces (faces resulting from superposition of the layers) 28 of the layers 27 are tilted facing the positive electrode sheet, and hence Li ions become intercalated and deintercalated smoothly, while an electron conduction path 94 becomes shorter. Therefore, this allows enhancing the electron conductivity of the negative electrode sheet 20. Therefore, the battery resistance of the lithium secondary battery can be reduced by using, as the negative electrode active material, an oriented graphite powder at a peak intensity ratio such as the above-described one. In such a case, expansion and contraction at the surface direction 92 (FIG. 1) of the negative electrode sheet are particularly large, and hence the effect elicited by the feature of the present invention, namely preventing buckling of the wound electrode body by virtue the feature of satisfying the abovementioned value of tensile elongation at break, can be brought out particularly well.

Besides the graphite powder, the negative electrode active material layer 24 can contain, as the case may require, one, two or more types of material that can be used as constituent components of a negative electrode active material layer in ordinary lithium secondary batteries. Examples of such a material include, for instance, various polymers that function as binders of the abovementioned graphite powder. As such a polymer there is preferably used, for instance, styrene-butadiene rubber (SBR), carboxymethyl cellulose (CMC), polytetrafluoroethylene (PTFE), polyethylene (PE), polyacrylic acid (PAA) or the like. Other examples of materials that can be used as components of the negative electrode active material layer include various polymer materials that can function as a thickener in the paste for forming a negative electrode active material layer.

Although not particularly limited thereto, the proportion of graphite in the entire negative electrode active material layer is preferably about 90 mass % or higher (typically, from 90 to 99 mass %), preferably from about 95 to 99 mass %. Although not particularly limited thereto, the proportion of binder in the entire negative electrode active material layer is preferably about 0.5 mass % or higher (typically, from 0.5 to 3 mass %), and preferably from about 0.5 to 2 mass %. If negative electrode active material layer-forming components (for instance, a thickener) are present other than the negative electrode active material and the binder, then the total content ratio of these arbitrary components is typically about 2 mass % or less, but is appropriately about 0.5 mass % or higher, and ranges preferably, for instance, from about 0.5 to 2 mass %. The thickener functions also as the abovementioned binder in the case of an aqueous solvent in the paste for forming a negative electrode active material layer. In this case, the combined proportion of binder and thickener in the entire negative electrode active material layer is appropriately about 1 mass % or higher, and ranges preferably from about 1 to 4 mass %.

The negative electrode active material layer 24 can be formed by applying a paste for forming a negative electrode active material layer, in which graphite and other negative electrode active material layer-forming components are dispersed in an appropriate solvent (preferably, an aqueous solvent), onto one or both faces of the negative electrode collector 22 (herein, both faces), in the form of a band, followed by drying. The paste for forming a negative electrode active material layer may be exposed to a magnetic field, stationarily or moving through the magnetic field, for each negative electrode collector 22, after complete volatilization of the solvent of the paste for forming a negative electrode active material layer (preferably, immediately after application of the paste). The graphite can be magnetically oriented as a result. The magnetic field resorted to for magnetic orientation may be formed by using, for instance, an electromagnet, a superconducting magnet or the like. The magnetic field is preferably a uniform magnetic field such that the magnetic field lines bear perpendicularly onto the surface direction 92 (FIG. 1) of the negative electrode sheet 20. The intensity of the magnetic field is not particularly limited, but may be set to range from about 250 mT to 700 mT. The time during which the paste for forming a negative electrode active material layer is disposed in the magnetic field may range from about 0.5 seconds to 60 seconds. The solvent contained in the paste for forming a negative electrode active material layer may be completely removed after such magnetic orientation.

After drying of the paste for forming a negative electrode active material layer, the thickness and the density (mix density) of the negative electrode active material layer 24 can be adjusted by performing an appropriate press-forming process (herein there can be used, for instance, various conventionally known pressing (rolling) methods, such as roll pressing, plate pressing or the like). The thickness of the negative electrode active material layer is not particularly limited, but ranges ordinarily from about 50 to 200 μm, preferably from 60 to 150 μm.

If the pressure during the pressing process is excessively large, the negative electrode collector 22 experiences work hardening on account of that pressure, and as a result the tensile elongation at break of the negative electrode sheet 20 may tend to drop. Preferably, the pressure in the pressing process may be adjusted in such a manner that the density of the negative electrode active material layer ranges from about 0.9 to 1.7 g/cm$^3$ (more preferably, from 1.1 to 1.5 g/cm$^3$, and particularly preferably from 1.1 to 1.3 g/cm$^3$). If the pressure is excessively higher than the above ranges, the negative electrode collector experiences work hardening, and as a result the tensile elongation at break of the negative electrode sheet may tend to drop. If the pressure is excessively lower than the above ranges, the energy density of the battery constructed using the negative electrode sheet may tend to drop.

The tensile elongation at break of the negative electrode sheet can be increased by performing a thermal treatment after pressing, even in the case where the negative electrode collector experiences work hardening on account of the pressure of the pressing process. Specifically, a thermal treatment after pressing is an important factor from the viewpoint of properly adjusting the tensile elongation at break of the negative electrode sheet.

Preferably, the thermal treatment temperature is set within a range from 120° C. to 250° C., in a nitrogen gas atmosphere or a vacuum atmosphere. As a result, the negative electrode collector softens during the thermal treatment, and there can be produced an optimal negative electrode sheet that satisfies the abovementioned values of tensile elongation at break (for instance, 23% or higher, preferably 3.6% or higher and particularly preferably 4.1. % or higher). The thermal treatment may be performed preferably at a temperature ranging from 120 to 250° C., more preferably from 150 to 200° C.

Preferably, the thermal treatment may be performed by raising the temperature from room temperature to a temperature region ranging from 120° C. to 250° C., and by holding the temperature region for 3 hours or more (for instance, 3 to 24 hours), preferably from 5 to 15 hours and particularly preferably from 7 to 10 hours. The temperature may be lowered from the above temperature region to 50° C. or lower (preferably, down to room temperature). The tensile elongation at break of the negative electrode sheet can be preferably increased by performing the thermal treatment on the negative electrode sheet after pressing, in accordance with such a thermal treatment schedule. Oxidation (and hence rises in resistance) of the negative electrode collector can be prevented by removing the negative electrode sheet at a temperature of 50° C. or lower.

The negative electrode sheet thus produced typically exhibits a tensile elongation at break of the negative electrode sheet, as measured using a commercially available tensile tester, of 2% or higher (for instance, of 2 to 10%), preferably of 4% or higher (typically, of 4 to 6%), i.e. a very high value of tensile elongation at break for this kind of negative electrode sheets. As a result, buckling of the wound electrode body can be properly prevented by using the negative electrode sheet disclosed herein.

As shown schematically by FIG. 2, the positive electrode sheet 10 disclosed herein can be formed through application of the positive electrode active material layer 14, having, as a main component, a positive electrode active material for lithium secondary batteries, onto both faces of the elongated positive electrode collector 12. An aluminum foil or some other metal foil that is appropriate for positive electrodes is used herein in the positive electrode collector 12.

As described above, the positive electrode sheet 10 disclosed herein has a predetermined value of tensile elongation at break. One appropriate condition for realizing such a tensile elongation at break may involve a method of selecting properly the material and the thickness of the positive electrode collector 12 contained in the positive electrode sheet 10. For instance, the material of the positive electrode collector is preferably a JIS 1000-series or 8000-series material. Aluminum foil of the 1000-series or 8000-series, of pure aluminum grade, has high ductility, and hence an appropriate positive electrode sheet that satisfies the abovementioned values of tensile elongation at break (for instance, 2% or higher, preferably 2.2% or higher and particularly preferably 2.5% or higher) can be achieved by using that aluminum foil as the positive electrode collector. The thickness of the collector can be selected as appropriate, in accordance with the intended application, but ordinarily good elongation properties are obtained at a thickness of 15 µm or greater (for instance, 15 to 40 µm, or greater), preferably 20 µm or greater, more preferably 30 µm or greater and particularly preferably 40 µm or greater. If the positive electrode collector is too thick, however, energy density may decrease, and the performance of the battery may be impaired. From the viewpoint of balancing energy density and elongation properties, the thickness of the positive electrode collector ranges preferably from about 15 to 25 µm.

One, two or more types of materials used in conventional lithium secondary batteries can be used, without particular limitations, as the positive electrode active material disclosed herein. Examples of preferred materials for applying the technology disclosed herein include, for instance, a positive electrode active material having, as a main component, an oxide (lithium transition metal oxide) that comprises, as metal elements, lithium and a transition metal element, for instance lithium nickel oxide ($LiNiO_2$), lithium cobalt oxide ($LiCoO_2$), lithium manganese oxide ($LiMn_2O_4$) or the like. Among the foregoing, the technology disclosed herein is preferably applied to a positive electrode active material having a lithium-nickel-cobalt-manganese complex oxide (for instance, $LiNi_{1/3}Co_{1/3}Mn_{1/3}O_2$) as a main component (typically, a positive electrode active material comprising substantially a lithium-nickel-cobalt-manganese complex oxide).

The lithium-nickel-cobalt-manganese-complex oxide is meant to encompass herein an oxide having Li, Ni, Co and Mn as constituent metal elements, and also an oxide comprising at least one metal element other than Li, Ni, Co and Mn (i.e. a transition metal element and/or a typical metal element other than Li, Ni, Co and Min). These metal elements may be, for instance, one, two or more elements selected from the group consisting of Al, Cr, Fe, V, Mg, Ti, Zr, Nb, Mo, W, Cu, Zn, Ga, In, Sn, La and Ce. The same applies to lithium nickel oxides, lithium cobalt oxides and lithium manganese oxides.

As such a lithium transition metal oxide (typically, in particulate form) there can be used, for instance, a lithium transition metal oxide powder, as-is, prepared in accordance with a conventionally known method. For instance, a lithium transition metal oxide powder substantially made up of secondary particles having a particle size ranging from about 1 µm to 25 µm can be preferably used as the positive electrode active material.

The positive electrode active material layer 14 can contain, as the case may require, one, two or more types of material that can be used as constituent components in positive electrode active material layers of ordinary lithium secondary batteries. Examples of such materials include, for instance, conductive materials. A carbon material such as a carbon powder or carbon fibers is preferably used as the conductive material. Alternatively, there may be used, for instance, a conductive metal powder such as a nickel powder or the like. Other examples of materials that can be used as components of the positive electrode active material layer include, for instance, various polymer materials that can function as a binder of the abovementioned constituent materials.

Although not particularly limited thereto, the proportion of the positive electrode active material with respect to the entire positive electrode active material layer is preferably about 50 mass % or higher (typically, 50 to 95 mass %), and preferably about 75 to 90 mass %. The proportion of the conductive material in the positive electrode active material layer can be, for instance, 3 to 25 mass %, preferably about 3 to 15 mass %, in a positive electrode active material layer having a composition that comprises a conductive material. In a case where positive electrode active material layer-forming components (for instance, a polymer material) other than the positive electrode active material and the conductive material are also present, then the total content ratio of such arbitrary components is preferably about 7 mass % or less, preferably about 5 mass % or less (for instance, about 1 to 5 mass %).

As the method for forming the positive electrode active material layer 14 a method is preferably resorted to that involves applying, in the form of a band, a paste forming a positive electrode active material layer, in which the positive electrode active material (typically, in particulate form) and other positive electrode active material layer-forming components are dispersed in an appropriate solvent (preferably, an aqueous solvent), onto one or both faces (herein, both faces), of the positive electrode collector 12. After drying of the paste for forming a positive electrode active material layer, the thickness and the density of the positive electrode active material layer 14 can be adjusted by performing an appropriate press-forming process (herein, there can be used for instance, various conventionally known pressing (rolling) methods, such as roll pressing, plate pressing or the like). The thickness of the positive electrode active material layer is not particularly limited, but ranges ordinarily from about 50 to 200 µm, preferably from 60 to 150 µm.

If the pressure during the pressing process is excessively large, the positive electrode collector 12 experiences work hardening on account of that pressure, and as a result the tensile elongation at break of the positive electrode sheet may tend to drop. Preferably, the pressure in the pressing process may be adjusted in such a manner that the density of the positive electrode active material layer ranges from about 1.7 to 2.7 $g/cm^3$ (more preferably, from 2.3 to 2.7 $g/cm^3$, and particularly preferably from 2.3 to 2.5 $g/cm^3$). If the pressure is excessively higher than the above ranges, the positive electrode collector experiences work hardening, and the tensile elongation at break of the positive electrode sheet may tend to drop as a result. If the pressure is excessively lower than the above ranges, the energy density of the battery constructed using the positive electrode sheet may tend to drop.

The tensile elongation at break of the positive electrode sheet can be increased by performing a thermal treatment after pressing, even in the case where the positive electrode collector experiences work hardening on account of the pressure of the pressing process. Specifically, a thermal treatment after pressing is an important factor from the viewpoint of properly adjusting the tensile elongation at break of the positive electrode sheet.

Preferably, the thermal treatment temperature is set within a range from 200° C. to 300° C., in a dry air atmosphere. As a result, the positive electrode collector softens during the thermal treatment, and there can be produced an optimal positive electrode sheet that satisfies the abovementioned values of tensile elongation at break (for instance, 2.2% or higher, preferably 2.9% or higher and particularly preferably 4.3% or higher). The thermal treatment may be performed preferably at a temperature ranging from 200 to 300° C., more preferably from 2.20 to 280° C., and particularly preferably from 240 to 260° C.

A drier or a heating roll can be used as the abovementioned heating means. If a heating roll is used, the thermal treatment may be preferably performed at a temperature region ranging from 200° C. to 300° C., for 1 second or longer (for instance, from 1 to 20 seconds), preferably for 5 to 10 seconds. If a drier is used, the thermal treatment may be preferably performed through a rise in temperature from room temperature to a temperature) region ranging from 200° C. to 300° C., and holding that temperature region for 20 seconds or longer (for instance, for 20 to 100 seconds), preferably 40 to 70 seconds. The temperature may be lowered from the above temperature region down to room temperature. The tensile elongation at break of the positive electrode sheet can be preferably increased by performing the thermal treatment on the positive electrode sheet after pressing, in accordance with such a thermal treatment schedule.

The positive electrode sheet thus produced typically exhibits a tensile elongation at break of the positive electrode sheet, as measured using a commercially available tensile tester, of 2% or higher (for instance, of 2 to 10%), preferably of 4% or higher (typically, of 4 to 6%), i.e. a very high value of tensile elongation at break for this kind of positive electrode sheets. As a result, buckling of the wound electrode body can be properly prevented by using the positive electrode sheet disclosed herein.

As an appropriate separator sheet 40 that is used between the positive and negative electrode sheets 10, 20 there can be utilized a separator sheet made up of a material identical to that of separators conventionally used in lithium secondary batteries, and having a tensile elongation at break of 2% or higher. Examples of such a material include, for instance, a porous polyolefin-based resin. For instance, a porous separator sheet made of a synthetic resin (for instance, a polyolefin such as polyethylene) can be appropriately used as the separator sheet. The thickness of the separator sheet is not particularly limited, but, ordinarily, good elongation properties are achieved when the thickness ranges from 10 to 50 preferably from 15 to 25 µm. Alternatively, the thickness may be 25 µm or greater (for instance, 25 to 50 µm).

The tensile elongation at break can be measured as follows. For instance, the battery is discharged and taken apart, and thereafter, the positive electrode sheet, the negative electrode sheet and the separator sheet are washed with dimethyl carbonate (DMC). Rectangular test pieces are cut out of the positive electrode sheet, the negative electrode sheet and the separator sheet, and are mounted onto a chuck 62 of a tensile tester 60 illustrated in FIG. 4. Each test piece 90 is pulled at a constant rate in the longitudinal direction, and the tensile elongation at break can then be worked out as $[(X1-X0)/X0]\times100$, where X0 denotes the distance (length in the test-piece flat section that constitutes the reference for elongation measurement) between two gauge marks 64a, 64b at the point in time where the load starts acting on the test piece 90 and X1 denotes the distance between the two gauge marks 64a, 64b at the point in time where the test piece 90 breaks.

<Lithium Secondary Battery>

Figure 5:
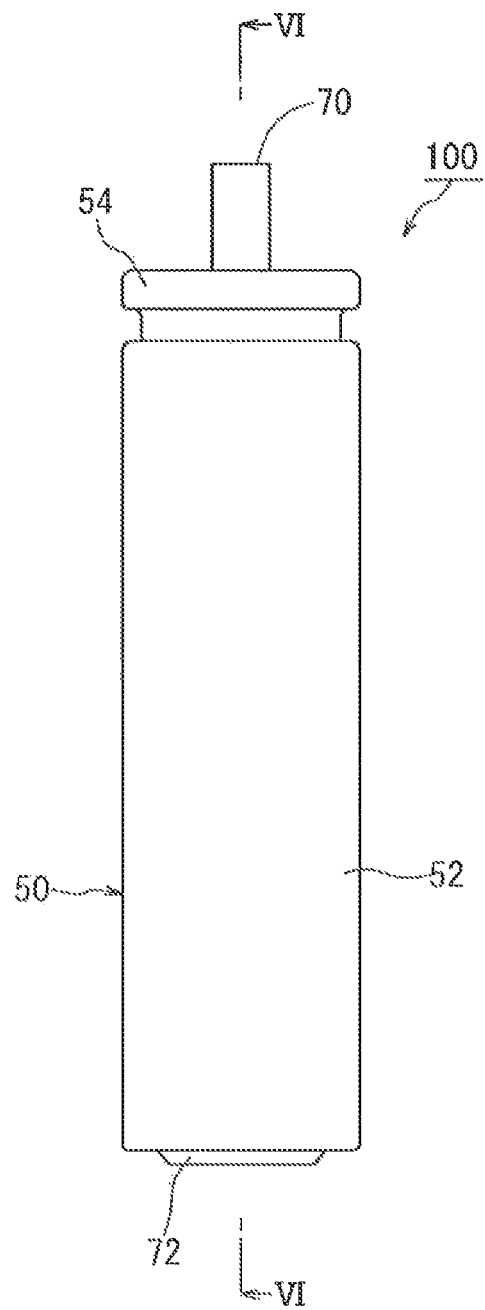
FIG. 5 is a side-view diagram illustrating schematically a lithium secondary battery according to an embodiment of the present invention.
Figure 6:
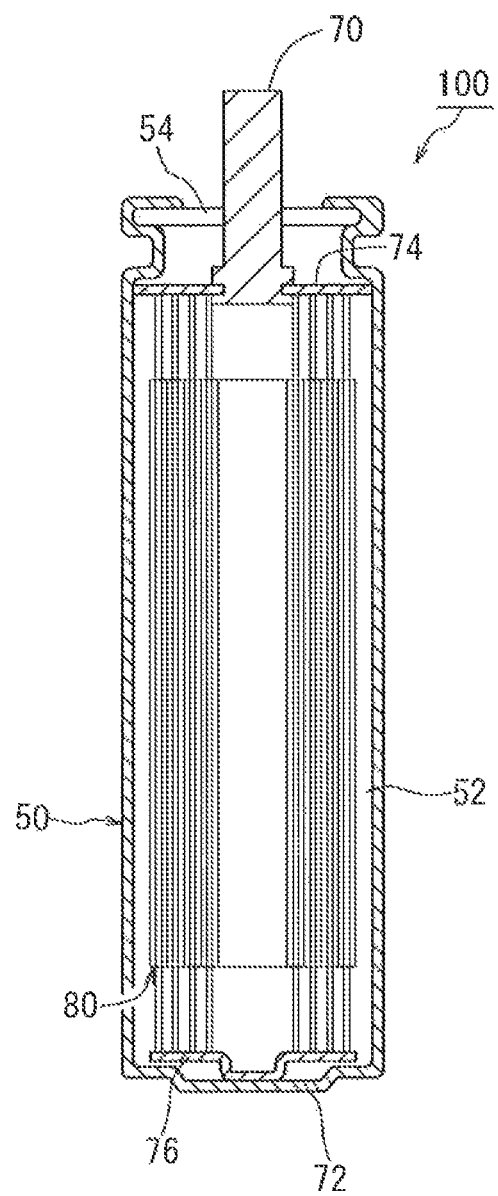
FIG. 6 is a cross-sectional diagram illustrating schematically a VI-VI cross-section of FIG. 5.
Figure 7:
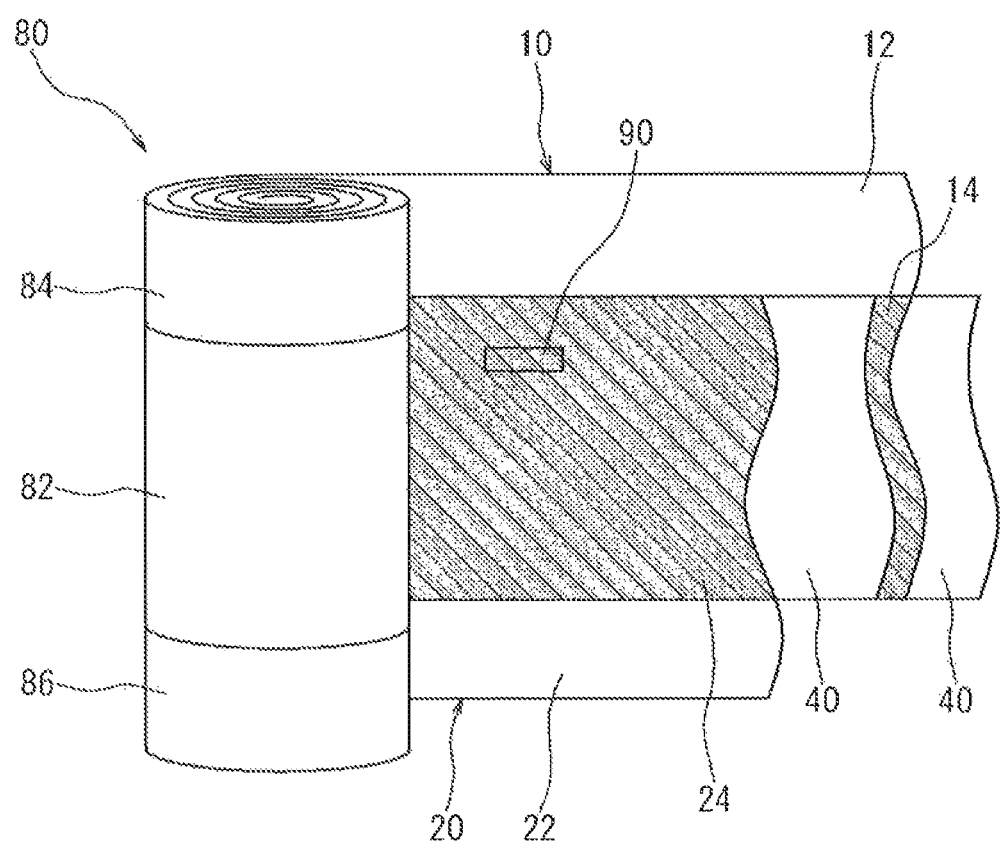
FIG. 7 is a schematic diagram for explaining a wound electrode body according to an embodiment of the present invention.

An explanation follows next, with reference to the schematic diagrams illustrated in FIGS. 5 to 7, on one embodiment of a lithium secondary battery that is provided with a wound electrode body made up of the positive electrode sheet, the negative electrode sheet and the separator sheet according to an embodiment of the present invention. The lithium secondary battery 100 has a configuration wherein the wound electrode body 80, of a form resulting from winding the positive electrode sheet 10 and the negative electrode sheet 20 with the separator sheet 40 interposed in between, is accommodated, together with a nonaqueous electrolyte solution, not shown, in an outer case 50 of a shape (cylindrical-type) that enables the wound electrode body 80 to fit therein.

The outer case 50 is provided with a case main body 52, of bottomed cylindrical shape, the inner space of which has a shape corresponding to that of the wound electrode body, and a lid body 54 that plugs an opening of the case main body 52. A metallic material such as aluminum, stainless steel, Ni-plated SUS or the like is preferably used as the material that makes up the outer case 50 (Ni-plated. SUS in the present embodiment). Alternatively, the outer case 50 may be molded out of a resin material such as PPS, a polyimide resin or the like. On the top face of the outer case 50 (i.e. on the lid body 54) there is provided a positive electrode terminal 70 that is electrically connected to the positive electrode 10 of the wound electrode body 80, and a negative electrode terminal 72 that is electrically connected to the negative electrode 20 of the wound electrode body 80 is provided in the bottom face of the outer case 50 (in the present embodiment, the case main body 52 doubles as the negative electrode terminal 72). The wound electrode body 80 is accommodated inside the outer case 50 together with a nonaqueous electrolyte solution not shown.

As illustrated in FIG. 7, the wound electrode body 80 according to the present embodiment has an elongated (band-like) sheet structure at a stage prior to assembly of the wound electrode body 80.

The positive electrode sheet 10 has a structure in which the positive electrode active material layer 14 that comprises the positive electrode active material is held on both faces of the elongated sheet-shaped and foil-like positive electrode collector 12, as described above. A positive electrode active material layer non-formation section is formed such that the positive electrode active material layer 14 is not formed at one side edge, in the width direction of the positive electrode sheet 10 (upper side edge in the figure), and the positive electrode collector 12 is exposed over a given width.

The negative electrode sheet 20 as well has a structure wherein the negative electrode active material layer 24 comprising a magnetically oriented negative electrode active material is held on both faces of the elongated sheet-shaped and foil-like negative electrode collector 22, similarly to the positive electrode sheet 10. A negative electrode active material layer non-formation section is formed such that the negative electrode active material layer 24 is not formed at one side edge, in the width direction of the negative electrode sheet 20 (lower side edge in the figure), and the negative electrode collector 22 is exposed over a given width.

To produce the wound electrode body 80, the positive electrode sheet 10 and the negative electrode sheet 20 are stacked with the separator sheet 40 interposed in between. Herein, the positive electrode sheet 10 and the negative electrode sheet 20 are superposed slightly offset in the width direction, in such a manner that the positive electrode active material layer non-formation portion of the positive electrode sheet 10 and the negative electrode active material layer non-formation portion of the negative electrode sheet 20 jut beyond respective sides of the separator sheet 40, in the width direction. The wound electrode body 80 can be produced then by winding the stack resulting from such superposition.

A wound core portion 82 (i.e. portion of close stacking between the positive electrode active material layer 14 of the positive electrode sheet 10, the negative electrode active material layer 24 of the negative electrode sheet 20, and the separator sheet 40) is formed at the central portion of the wound electrode body 80 in the winding axial direction. The electrode active material layer non-formation portions of the positive electrode sheet 10 and the negative electrode sheet 20 jut outward of the wound core portion 82 at respective end portions of the wound electrode body 80, in the winding axial direction. A positive electrode lead terminal 74 and a negative electrode lead terminal 76 are respectively attached to a positive electrode-side jutting portion (i.e. non-formation portion of the positive electrode active material layer 14) 84 and a negative electrode-side jutting portion (i.e. non-formation portion of the negative electrode active material layer 24) 86, the positive electrode lead terminal 74 and the negative electrode lead terminal 76 being electrically connected to the above-described positive electrode terminal 70 and negative electrode terminal 72, respectively (herein, the case main body 52 doubles as the negative electrode terminal 72).

The wound electrode body 80 having such a configuration is accommodated in the case main body 52, and an appropriate nonaqueous electrolyte solution is arranged (poured) in the case main body 52. The nonaqueous electrolyte solution that is accommodated together with the wound electrode body 80 in the case main body 52 is not particularly limited, and may be identical to nonaqueous electrolyte solutions that are used in conventional lithium secondary batteries. The nonaqueous electrolyte solution has a composition that contains typically a supporting salt in an appropriate nonaqueous solvent. Examples of the nonaqueous solvent that can be used include, for instance, ethylene carbonate (EC), ethyl methyl carbonate (EMC), dimethyl carbonate (DMC), diethyl carbonate (DEC), propylene carbonate (PC) and the like. As the supporting salt there can be used preferably a lithium salt such as $LiPF_6$, $LiBF_4$, $LiAsF_6$, $LiCF_3SO_3$, $LiClO_4$ or the like. For instance, there can be preferably used a nonaqueous electrolyte solution that contains $LiPF_6$, as the supporting salt, at a concentration of about 1 mol/liter, in a mixed solvent of EC, EMC and DMC at a 3:4:3 volume ratio.

The nonaqueous electrolyte solution is accommodated in the case main body 52 together with the wound electrode body 80, and the opening of the case main body 52 is sealed with the lid body 54, to complete thereby the construction (assembly) of the lithium ion battery 100 according to the present embodiment. The sealing process of the case main body 52 and the process of arranging (pouring) the electrolyte solution can be performed in accordance with methods identical to those of in the production of conventional lithium secondary batteries. Thereafter, the battery is subjected to conditioning (initial charge and discharge). Various other processes, such as degassing, quality inspection and the like may also be performed, as the case may require.

Buckling of the wound electrode body is properly prevented in a lithium secondary battery thus constructed. The battery can deliver as a result superior battery performance. For instance, the battery exhibits a superior charge and discharge cycle characteristic, without degradation in capacity even when subjected to charge and discharge cycles.

A preferred use for the technology disclosed herein is a battery which, as illustrated in FIG. 6, is provided with the outer case 50 having an inner space with a shape (herein, a cylindrical shape) corresponding to the wound electrode body 80, and wherein the wound electrode body 80 is disposed in that inner space in such a way so as not to come into contact with the inner wall of the outer ease 50. The wound electrode body 80, thus disposed so as not to come into contact with the inner wall of the outer case 50, buckles readily, and hence and hence it is particularly useful to resort to a configuration that satisfies the abovementioned values of tensile elongation at break.

The technology disclosed herein can provide a lithium secondary battery that comprises a wound electrode body having the above-described oriented negative electrode active material, such that the tensile elongation at break of the positive electrode sheet, the negative electrode sheet and the separator sheet that make up the wound electrode body is 2% or higher, and wherein in the below-described charge and discharge cycle test:

i.e. a test that involves carrying out 2000 successive charge and discharge cycles each of which involves charging the battery up to a voltage of 3.69 V across terminals of the lithium secondary battery in an environment at room temperature (about 25° C.), followed by discharge at constant current of 40 A for 20 seconds, with subsequent charging at constant current of 40 A for 20 seconds;

the capacity retention rate after cycling, worked out based on the capacity after cycling and the capacity before: the charge and discharge cycle test, is 90% or higher (typically, 92% or higher, preferably 94% or higher, more preferably 96% or higher, and particularly preferably 97% or higher).

The capacities before and after the charge and discharge cycles are calculated on the basis of the discharge capacity at a time where the battery has been discharged at a constant current of 4 A down to a voltage across terminals of 3.0 V, under a temperature condition of 25° C., after having been charged, at a constant current of 4 A, to a voltage across terminals of 4.1 V, under a temperature condition of 25° C. The capacity retention rate after cycling is worked out from [(capacity after the charge and discharge cycle test)/(capacity before the charge and discharge cycle test)]×100.

The technology disclosed herein provides a method for producing a lithium secondary battery that comprises a wound electrode body having the above-described oriented negative electrode active material, wherein the method involves, as a characterizing feature, measuring (evaluating) the tensile elongation at break of a positive electrode sheet, a negative electrode sheet and a separator sheet that make up the wound electrode body. The production method comprises the following steps:

a step of measuring the tensile elongation at break of the positive electrode sheet, the negative electrode sheet and the separator sheet;

a step of determining whether or not the positive electrode sheet, the negative electrode sheet and the separator sheet are good (for instance, whether or not the tensile elongation at break lies within a range from 2% to 5%), on the basis of the measured tensile elongation at break; and a step of constructing a wound electrode body using the positive electrode sheet, the negative electrode sheet and the separator sheet having been deemed good in that determination.

Such a production method allows producing a nonaqueous electrolyte secondary battery of high durability towards charge and discharge cycles and in which buckling of a wound electrode body is prevented.

The present invention will be explained next based on examples.

Measurement Method

The measurement method in the examples of the present invention was as follows.

[Tensile Elongation at Break]

Figure 4:
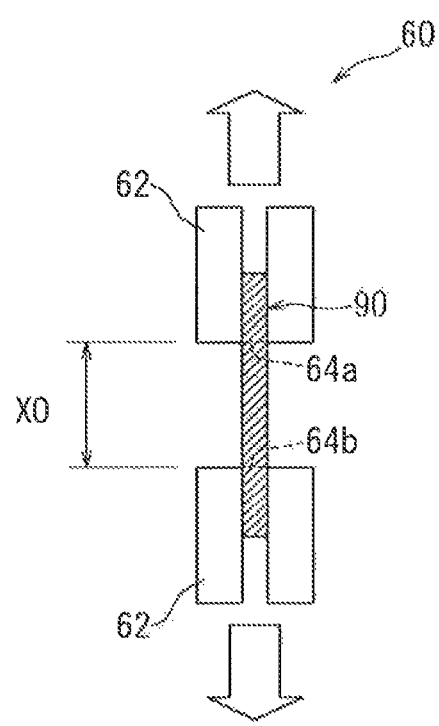
FIG. 4 is a schematic diagram for explaining a measurement method of tensile elongation at break according to an embodiment of the present invention.
Figure 8:
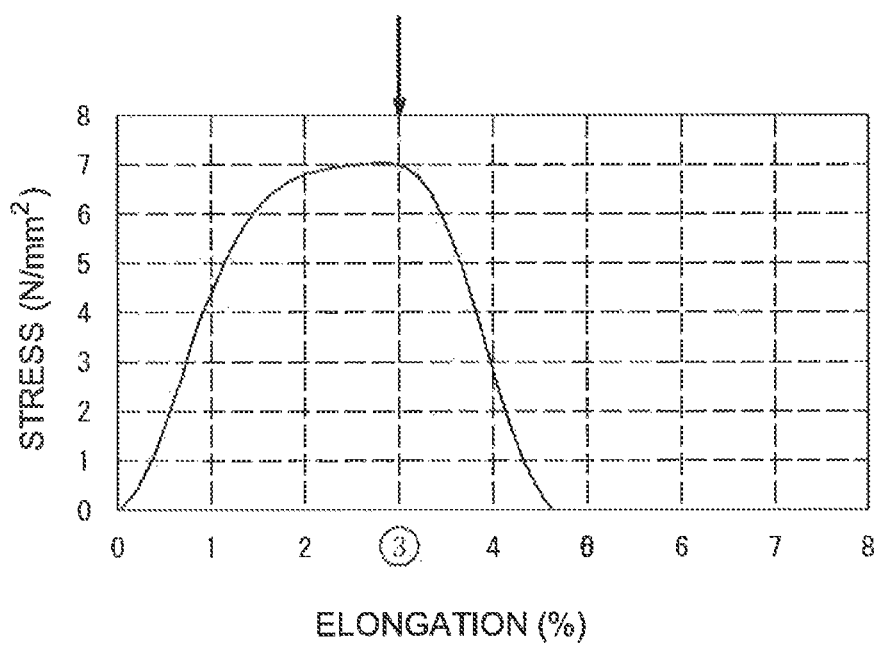
FIG. 8 is a graph for explaining a measurement method of tensile elongation at break according to an example of the present invention.
Figure 9:
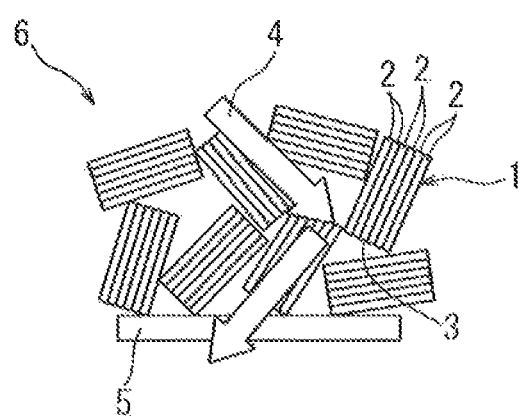
FIG. 9 is a cross-sectional diagram illustrating schematically a negative electrode sheet having graphite that is not magnetically oriented.
Figure 10:
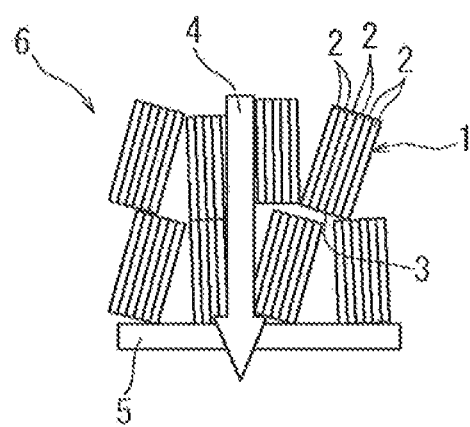
FIG. 10 is a cross-sectional diagram illustrating schematically a negative electrode sheet having magnetically oriented graphite.
Figure 11:
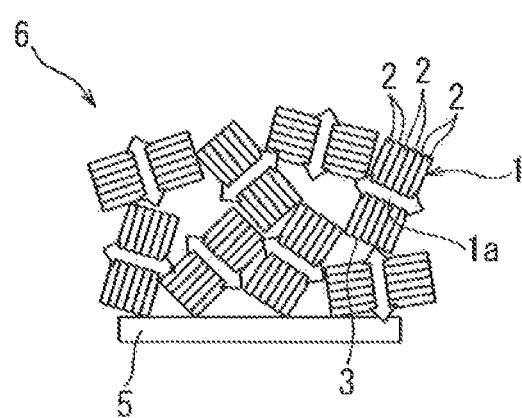
FIG. 11 is a cross-sectional diagram illustrating schematically a negative electrode sheet having an active material (for instance, graphite) that is not magnetically oriented.
Figure 13:
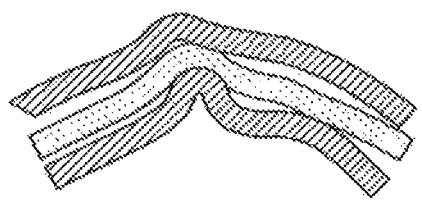
FIG. 13 is a schematic diagram for explaining buckling of a wound electrode body.

The positive electrode sheet, the negative electrode sheet and the separator sheet were cut out to a rectangular shape 60 mm long×15 mm wide, to yield the test piece 90 (FIG. 7). The test piece 90 was set in the chuck 62 of the tensile tester 60, in such a way so as to avoid both slackness and strain (FIG. 4). The distance between the two gauge marks 64a, 64b was set to 20 mm. The test piece was pulled in the longitudinal direction at a rate of 100 mm/min, and the tensile elongation at break was worked out based on Expression (1) above, where X0 denotes the distance between two gauge marks 64a, 64b at the point in time where the load starts acting on the test piece, and X1 denotes the distance between the two gauge marks 64a, 64b at the point in time where the test piece breaks. FIG. 8 illustrates an example of a measurement graph of tensile elongation at break. In the example of FIG. 8 the tensile elongation at break was 3%. The tensile elongation at break was measured using a tensile tester marketed by A&D company.

[Intensity Ratio of the {(110)/(004)} Planes]

The intensity ratio of the {(110)/(004)} planes was measured using an X-ray diffraction instrument RINT 1400 marketed by Rigaku Denki. Herein, Cu—Kα rays were used as the X-ray light source, the X-ray tube voltage was set to 40 kV, and the X-ray tube current was set to 200 mA. The surface of the negative electrode active material layer was used as the measurement surface for X-ray diffraction, and the peak intensity ratio I(110)/I(004) was worked out.

[Mix Density]

A respective test piece having a surface area S was cut out of each electrode sheet (positive electrode sheet and negative electrode sheet), and the thickness t and mass W1 of the cut test piece were measured. The mass W2 of the collector alone was measured then after removal of the active material from the test piece, to calculate the mix density=(W1−W2)/(t×S).

Example 1

Positive Electrode Sheet

A paste for a positive electrode active material layer was prepared by mixing a powder of lithium-nickel-cobalt-manganese oxide (LiNi$_{1/3}$Co$_{1/3}$Mn$_{1/3}$O$_2$), as a positive electrode active material, acetylene black (AB) as a conductive material, and poly vinylidene fluoride (PCdF) as a binder, to a mass ratio of 90:8:2, in N-methylpyrrolidone (NMP). A positive electrode sheet having the positive electrode active material layer provided on both faces of the positive electrode collector was produced by applying, in the form of a band, the paste for a positive electrode active material layer, onto both faces of an elongated sheet-shaped aluminum foil (herein there was used pure aluminum grade, 1000-series 1085-H18 (temper designation)) having a thickness of 15 μm. The coating amount of the paste for a positive electrode active material layer was adjusted so as to yield about 12 mg/cm² (solids basis) for both faces combined. After drying, the whole was pressed so as to yield a density of the positive electrode active material layer about 2.3 g/cm³. Table 1 gives the characteristics of the positive electrode sheet according to Example 1. The tensile elongation at break of the positive electrode sheet was 2.2%.

<Negative Electrode Sheet>

A paste for a negative electrode active material layer was prepared by dispersing a graphite powder (herein there was used a product resulting from spheroidizing flake natural graphite), as the negative electrode active material, styrene-butadiene rubber (SBR) as a binder, and carboxymethyl cellulose (CMC) as a thickener, in water, to a mass ratio of the foregoing materials of 98:1:1. The paste for a negative electrode active material layer was coated onto both faces of an elongated sheet-shaped copper foil having a thickness of 10 μm (an electrolytic copper foil WC was used herein). The paste was disposed between a pair of electromagnets for each copper foil, and was dried while under application of a 400 mT magnetic field, to produce as a result a negative electrode sheet in which the negative electrode active material layer was provided on both faces of the negative electrode collector. The coating amount of the paste for a negative electrode active material layer was adjusted so as to yield about 8 mg/cm² (solids basis) for both faces combined. After drying, the whole was pressed so as to yield a density of the negative active material layer of about 1.1 g/cm³. Table 1 gives the characteristics of the negative electrode sheet according to Example 1. It was found the intensity ratio of the {(110)/(004)} planes was 2.14, and that the (004) plane of graphite was strongly oriented in a direction perpendicular to the negative electrode sheet.

<Separator Sheet=.

A separator sheet made of porous polyethylene (PE) and having a thickness of 25 μm was used as the separator sheet. Table 1 gives the characteristics of the separator sheet according to Example 1.

<Lithium Secondary Battery>

A wound electrode body was produced by winding the abovementioned positive electrode sheet and the abovementioned negative electrode sheet with two of the separator sheets interposed in between. The wound electrode body thus obtained was accommodated in a cylindrical-type battery case (outer case), together with a nonaqueous electrolyte solution, and the opening of the battery case was sealed hermetically. The wound electrode body was disposed in the inner space of the body in such a way so as not to come into contact with the case inner wall. As the nonaqueous electrolyte solution there was used a nonaqueous electrolyte solution that contained LiPF$_6$, as a supporting salt, to a concentration of about 1 mot/liter in a mixed solvent of ethylene carbonate (EC), ethyl methyl carbonate (EMC) and dimethyl carbonate (DMC) at a 3:4:3 volume ratio. A lithium secondary battery was thus assembled. Thereafter, an initial charge and discharge process was carried out in accordance with an ordinary procedure, to yield a lithium secondary battery for testing. The rated capacity of the lithium secondary battery is 4 Ah.

Example 2

A lithium secondary battery was produced in the same way as in Example 1, but herein the material of the aluminum foil of the positive electrode sheet was Changed to 8000-series 8021-H18 (temper designation). Table 1 gives the characteristics of the positive electrode sheet according to Example 2.

Comparative Example 1

A lithium secondary battery was produced in the same way as in Example 1, but herein the material of the aluminum foil of the positive electrode sheet was changed to 3000-series 3003-H18 (temper designation). Table 1 gives the characteristics of the positive electrode sheet according to Comparative Example 1.

Comparative Example 2

A lithium secondary battery was produced in the same way as in Example 1, but herein the material of the copper foil of the negative electrode sheet was changed to a rolled copper foil C1100-H. Table 1 gives the characteristics of the negative electrode sheet according to Comparative Example 2.

Comparative Example 3

A lithium secondary battery was produced in the same way as in Example 1, but herein a cellulosic nonwoven fabric was used as the separator sheet. Table 1 gives the characteristics of the separator sheet according to Comparative Example 2.

Reference Example 1

A lithium secondary battery was produced in the same way as in Comparative Example 3, but herein the negative electrode sheet was produced without magnetically orienting the graphite powder. Table 1 gives the characteristics of the negative electrode sheet according to Reference Example 1, The peak intensity ratio of the {(110)/(004)} planes was found to be 0.03, indicative of virtually no orientation in the graphite.

seconds. The capacity retention rate after cycling was calculated from the capacity before the charge and discharge cycle test and the capacity after the charge and discharge cycle test. The capacities before and after the charge and discharge cycles were worked out on the basis of the discharge capacity at a time where the battery had been discharged at a constant current of 4 A down to a voltage across terminals of 3.0 V, under a temperature condition of 25° C., after having been charged, at a constant current of 4 A, to a voltage across terminals of 4.1 V, under a temperature condition of 25° C. The capacity retention rate after cycling was worked out from [(capacity after the charge and discharge cycle test)/(capacity before the charge and discharge cycle test)]×100. The results are given in Table 1.

As the results of Table 1 show, the batteries according to Comparative Examples 1 to 3, where the tensile elongation at break was lower than 2% in all of the positive electrode sheet, the negative electrode sheet and the separator sheet, exhibited a poor cycle characteristic, with a capacity retention rate of 80% or lower. By contrast, the batteries of Examples 1 and 2, where the positive electrode sheet, the negative electrode sheet and the separator sheet exhibited all a tensile elongation at break of 2% or higher, boasted a good cycle characteristic, with a capacity retention rate of 90% or higher. That is because in the batteries of Examples 1 and 2, elongation of the various sheets was improved, and buckling of the wound electrode body could be prevented as a result. That is, the cycle characteristic was enhanced by preventing buckling of the wound electrode body. This result indicates that, preferably, the positive electrode sheet, the negative electrode sheet and the separator sheet all have a tensile elongation at break of 2% or higher, from the viewpoint of improving the cycle characteristic.

The battery according to Reference Example 1, in which graphite was not magnetically oriented, had a capacity reten-

TABLE 1

| | Positive electrode | | Negative electrode | | | Separator | | |
| --- | --- | --- | --- | --- | --- | --- | --- | --- |
| | Collector type | Positive electrode elongation | Collector type | I(110)/I(004) | Negative electrode elongation | Separator type | Separator elongation | Capacity retention rate |
| Example 1 | 1085-H18 | 2.2% | Electrolytic copper foil WS | 2.14 | 2.7% | PE | 150% | 92% |
| Example 2 | 8021-H18 | 2.5% | Electrolytic copper foil WS | 2.14 | 2.7% | PE | 150% | 93% |
| Comp. Ex. 1 | 3003-H18 | 1.5% | Electrolytic copper foil WS | 2.14 | 2.7% | PE | 150% | 77% |
| Comp. Ex. 2 | 1085-H18 | 2.2% | Rolled copper foil G1100-H | 2.09 | 1.4% | PE | 150% | 77% |
| Comp. Ex. 3 | 1085-H18 | 2.2% | Electrolytic copper foil WS | 2.14 | 2.7% | Cellosic nonwoven fabric | 1.8% | 79% |
| Ref. Ex. 1 | 3003-H18 | 1.5% | Electrolytic copper foil WS | 0.03 | 2.7% | PE | 150% | 93% |

<Charge and Discharge Cycle Test>

The lithium secondary batteries in the above-described Examples 1 and 2, Comparative Examples 1 to 3 and Reference Example 1 were subjected to a charge and discharge cycle test. Specifically, each lithium secondary battery was subjected to 2000 consecutive charge and discharge cycles, wherein each cycle involved charging up to a voltage across terminals of 3.69 V, followed by discharge at constant current of 40 A for 20 seconds, in an environment at about 25° C., with subsequent charging at constant current of 40 A for 20 tion rate that exceeded 90%, despite the fact that the tensile elongation at break of the positive electrode sheet was lower than 2%. That is, capacity degradation upon charge and discharge cycles such as that in the batteries of Comparative Examples 1 to 3 was not observed in the battery of Reference Example 1, in which graphite was not magnetically oriented. This indicates that the effect elicited by the feature of the present invention, namely setting the tensile elongation at break to be 2% or higher, is particularly effective in batteries with magnetic orientation.

Example 3

A lithium secondary battery was produced in the same way as in Example 1, but herein the pressing pressure was modified in such a manner that the density of the positive electrode active material layer of the positive electrode sheet was about 2.5 g/cm$^3$. Table 2 gives the characteristics of the positive electrode sheet according to Example 3.

Example 4

A lithium secondary battery was produced in the same way as in Example 1, but herein the pressing pressure was modified in such a manner that the density of the positive electrode active material layer of the positive electrode sheet was about 23 g/cm$^3$. Table 2 gives the characteristics of the positive electrode sheet according to Example 4.

Comparative Example 4

A lithium secondary battery was produced in the same way as in Example 1, but herein the pressing pressure was modified in such a manner that the positive electrode active material layer of the positive electrode sheet was about 2.9 g/cm$^3$, Table 2 gives the characteristics of the positive electrode sheet according to Comparative Example 4.

Comparative Example 5

A lithium secondary battery was produced in the same way as in Example 1 but herein the thickness of the positive electrode collector of the positive electrode sheet was changed to 12 μm. Table 2 gives the characteristics of the positive electrode sheet according to Comparative Example 5.

<Charge and Discharge Cycle Test>

The lithium secondary batteries of Examples 3 and 4 and Comparative Examples 4 and 5 were subjected to a charge and discharge cycle test, and the capacity retention rate after cycling of each battery was measured. The results are given in Table 2.

TABLE 2

| | Positive electrode | | | | |
|---|---|---|---|---|---|
| | Collector type | Collector thickness | Mix density | Positive electrode elongation | Capacity retention rate |
| Example 1 | 1085-H18 | 15 μm | 2.3 g/cm$^3$ | 2.2% | 92% |
| Example 3 | 1085-H18 | 15 μm | 2.5 g/cm$^3$ | 2.2% | 92% |
| Example 4 | 1085-H18 | 15 μm | 2.7 g/cm$^3$ | 2.0% | 92% |
| Comp. Ex. 4 | 1085-H18 | 15 μm | 2.9 g/cm$^3$ | 1.1% | 71% |
| Comp. Ex. 5 | 1085-H18 | 12 μm | 2.3 g/cm$^3$ | 1.5% | 72% |

As the results of Table 2 show, the tensile elongation at break of the positive electrode sheet tended to drop when the pressure of the press was raised and the density of the positive electrode active material layer was increased, since the positive electrode collector experienced work hardening in such a case. In the tested batteries, it was possible to obtain a battery having a tensile elongation at break of the positive electrode sheet of 2.0% or higher and having a good cycle characteristic (Examples, 1, 3 and 4) by setting the density of the positive electrode active material layer to 2.7 g/cm$^3$ or lower, and the thickness of the positive electrode collector to be 15 μm or greater, in particular, setting the density of the positive electrode active material layer to be 2.5 g/cm$^3$ or lower and the thickness of the positive electrode collector to be 15 μm or greater made it possible to reach a very high tensile elongation at break, of 2.2% or higher, and to obtain a battery having a yet better cycle characteristic (Examples 1 and 3). From the viewpoint of increasing the tensile elongation at break of the positive electrode sheet, pressing is preferably performed in such a manner that the density of the positive electrode active material layer is 2.7 g/cm$^3$ or lower (for instance, 2.3 to 2.7 g/cm$^3$). Preferably, the thickness of the positive electrode collector is preferably set to 15 μm or greater (for instance, 15 to 40 μm).

Example 5

A lithium secondary battery was produced in the same way as in Example 1, but herein the pressing pressure was modified in such a manner that the density of the negative electrode active material layer of the negative electrode sheet was about 1.3 g/cm$^3$. Table 3 gives the characteristics of the negative electrode sheet according to Example 5.

Example 6

A lithium secondary battery was produced in the same way as in Example 1, but herein the pressing pressure was modified in such a manner that the density of the negative electrode active material layer of the negative electrode sheet was about 1.5 g/cm$^3$. Table 3 gives the characteristics of the positive electrode sheet according to Example 6.

<Charge and Discharge Cycle Test>

The lithium secondary batteries of Examples 5 and 6 were subjected to a charge and discharge cycle test, and the capacity retention rate after cycling of each battery was measured. The results are given in Table 3:

TABLE 3

| | Negative electrode | | | | | |
|---|---|---|---|---|---|---|
| | Collector type | Collector thickness | Mix density | I(110)/I(004) | Negative electrode elongation | Capacity retention rate |
| Example 1 | Electrolytic copper foil WS | 10 μm | 1.1 g/cm$^3$ | 2.14 | 2.7% | 92% |
| Example 5 | Electrolytic copper foil WS | 10 μm | 1.3 g/cm$^3$ | 1.46 | 2.7% | 93% |
| Example 6 | Electrolytic copper foil WS | 10 μm | 1.5 g/cm$^3$ | 0.77 | 2.7% | 92% |

As Table 3 shows, batteries having a tensile elongation at break of the negative electrode sheet of 2.7% or higher and having a good cycle characteristic could be obtained (Examples 1, 5 and 6) by prescribing the density of the negative electrode active material layer to be 1.5 g/cm³ or lower and the thickness of the negative electrode collector to be 10 or greater. From the viewpoint of increasing the tensile elongation at break of the negative electrode sheet, pressing is preferably performed in such a manner that the density of the negative electrode active material layer is 1.5 g/cm³ or lower (for instance, 1.1 to 1.5 g/cm³). Preferably, the thickness of the negative electrode collector is preferably set to 10 μm or greater (for instance, 10 to 25 μm).

Example 7

A lithium secondary battery was produced in the same way as in Example 1, but herein a thermal treatment was performed after pressing in such a manner that the density of the positive electrode active material layer was about 2.3 g/cm³. The thermal treatment was performed by holding in a dry air atmosphere at 250° C. for 30 seconds. Table 4 gives the characteristics of the positive electrode sheet according to Example 7.

Example 8

A lithium secondary battery was produced in the same way as in Example 1, but herein a thermal treatment was performed after pressing in such a manner that the density of the positive electrode active material layer was about 2.9 g/cm³. The thermal treatment was performed by holding in a dry air atmosphere at 250° C. for 30 seconds. Table 4 gives the characteristics of the positive electrode sheet according to Example 8.

Example 9

A lithium secondary battery was produced in the same way as in Example 2, but herein a thermal treatment was performed after pressing in such a manner that the density of the positive electrode active material layer was about 2.3 g/cm³. The thermal treatment was performed by holding in a dry air atmosphere at 250° C. for 30 seconds. Table 4 gives the characteristics of the positive electrode sheet according to Example 9.

Example 10

A lithium secondary battery was produced in the same way as in Example 2, but herein the thermal treatment was performed after application (coating and dying) of the positive electrode active material layer; the thermal treatment was followed by pressing in such a manner that the density of the positive electrode active material layer was about 2.3 g/cm³. The thermal treatment was performed by holding in a dry air atmosphere at 250° C. for 30 seconds. Table 4 gives the characteristics of the positive electrode sheet according to Example 10.

<Charge and Discharge Cycle Test>

The lithium secondary batteries of Examples 7 and 10 were subjected to a charge and discharge cycle test, and the capacity retention rate after cycling of each battery was measured. The results are given in Table 4.

TABLE 4

| | Positive electrode | | | | |
| --- | --- | --- | --- | --- | --- |
| | Collector type | Mix density | Thermal treatment | Positive electrode elongation | Capacity retention rate |
| Example 1 | 1085-H18 | 2.3 g/cm³ | None | 2.2% | 92% |
| Example 7 | 1085-H18 | 2.3 g/cm³ | After pressing | 2.9% | 94% |
| Example 8 | 1085-H18 | 2.9 g/cm³ | After pressing | 2.3% | 92% |
| Example 9 | 8021-H18 | 2.3 g/cm³ | After pressing | 4.3% | 96% |
| Example 10 | 8021-H18 | 2.3 g/cm³ | After application | 2.7% | 94% |
| Comp. Ex. 4 | 1085-H18 | 2.9 g/cm³ | None | 1.1% | 71% |

As the results of Table 4 show, softening could be elicited in the positive electrode collector, and the tensile elongation at break of the positive electrode sheet could be increased, by performing a thermal treatment. A comparison between Example 9 and Example 10 reveals that the tensile elongation at break of the positive electrode sheet is greater, and the softening effect on the positive electrode collector is higher, in a case where the thermal treatment is performed after pressing than in a case where the thermal treatment is performed after coating (before pressing). A comparison between Example 8 and Comparative Example 4 shows that a tensile elongation at break of 2% or higher could be achieved, and battery having a good cycle characteristic could be obtained, by performing a thermal treatment, even in a case where the pressing pressure was raised and the positive electrode collector experienced work hardening. In the case of the batteries tested herein, it was possible to achieve batteries having a tensile elongation at break of the positive electrode sheet of 2.3% or higher and having a good cycle characteristic (Examples 7 to 10). In particular, it was possible to obtain a battery in having a very high tensile elongation at break, of 2.9% or higher, and having a yet better cycle characteristic (Examples 7 and 9), by setting the density of the positive electrode active material layer to 2.3 g/cm³ and by performing a thermal treatment after pressing. Preferably, the thermal treatment is performed after pressing, from the viewpoint of increasing the tensile elongation at break of the positive electrode sheet.

Example 11

A lithium secondary battery was produced in the same way as in Example 1, but herein a thermal treatment was performed after pressing in such a manner that the density of the negative electrode active material layer was about 1.1 g/cm³. The thermal treatment was performed through holding in a nitrogen gas atmosphere at 180° C. for 8 hours. Table 5 gives the characteristics of the negative electrode sheet according to Example 11.

Example 12

A lithium secondary battery was produced in the same way as in Comparative Example 2, but herein a thermal treatment was performed after pressing in such a manner that the density of the negative electrode active material layer was about 1.1 g/cm³. The thermal treatment was performed through holding in a nitrogen gas atmosphere at 180° C. for 8 hours. Table 5 gives the characteristics of the negative electrode sheet according to Example 11.

<Charge and Discharge Cycle Test>

The lithium secondary batteries of Examples 11 and 12 were subjected to a charge and discharge cycle test, and the capacity retention rate after cycling of each battery was measured. The results are given in Table 5,

TABLE 5

| | Negative electrode | | | | |
|---|---|---|---|---|---|
| | Collector type | Mix density | Thermal treatment | I(110)/I(004) | Negative electrode elongation | Capacity retention rate |
| Example 1 | Electrolytic copper foil WS | 1.1 g/cm³ | None | 2.14 | 2.7% | 92% |
| Example 11 | Electrolytic copper foil WS | 1.1 g/cm³ | After pressing | 2.17 | 4.1% | 96% |
| Example 12 | Rolled copper foil G1100-H | 1.1 g/cm³ | After pressing | 2.10 | 3.6% | 96% |
| Comp. Ex. 2 | Rolled copper foil C1100-H | 1.1 g/cm³ | None | 2.09 | 1.4% | 77% |

As Table 5 makes clear, softening could be elicited in the negative electrode collector, and the tensile elongation at break of the negative electrode sheet could be increased, by performing a thermal treatment after pressing. A comparison between Example 12 and Comparative Example 2 reveals that a battery having a tensile elongation at break of the negative electrode sheet of 3.6% or higher and having a good cycle characteristic could be obtained by performing a thermal treatment after pressing, even when using a rolled copper foil that does not stretch readily. In the case of the batteries tested herein, it was possible to reach a very high tensile elongation at break, of 4.1%, and to obtain a battery having a yet better cycle characteristic, by using an electrolytic copper foil and by performing a thermal treatment after pressing (Example 11). Preferably, the thermal treatment is performed after pressing, from the viewpoint of increasing the tensile elongation at break of the negative electrode sheet.

Example 13

A lithium secondary battery was produced in the same way as in Example 1, but herein there was produced a flat wound electrode body that was accommodated in a square-shaped battery case. The flat wound electrode body was produced by winding the positive electrode sheet and the negative electrode sheet with two separator sheets interposed in between, and by squashing the resulting wound body from the sides.

Example 14

A lithium secondary battery was produced in the same way as in Example 13, but herein the produced battery was restrained with a restraining member in such a manner that a predetermined pressure (about 1.4 MPa) was exerted onto the flat wound electrode body that was accommodated in the battery case.

Comparative Example 6

A lithium secondary battery was produced in the same way as in Comparative Example 1, but herein there was produced a flat wound electrode body that was accommodated in a square-shaped battery case. The flat wound electrode body was produced by winding the positive electrode sheet and the negative electrode sheet with two separator sheets interposed in between, and by squashing the resulting wound body from the sides.

Comparative Example 7

A lithium secondary battery was produced in the same way as in Comparative Example 6, but herein the produced battery was restrained with a restraining member in such a manner that a predetermined pressure (about 1.4 MPa) was exerted onto the flat wound electrode body that was accommodated in the battery case.

Reference Example 2

A lithium secondary battery was produced in the same way as in Comparative Example 6, but herein there was produced a stacked-type wound electrode body that was accommodated in a square-shaped battery case. The stacked-type electrode body was produced by cutting out the positive electrode sheet, the negative electrode sheet and the separator sheets into plate shapes, and by alternately superposing these plates on each other.

<Charge and Discharge Cycle Test>

The lithium secondary batteries of Examples 13 and 14, Comparative Examples 6 and 7, and Reference Example 2 were subjected to a charge and discharge cycle test, and the capacity retention rate after cycling of each battery was measured. The results are given in Table 6.

TABLE 6

| | Positive electrode | | Battery | | | |
|---|---|---|---|---|---|---|
| | Collector type | Positive electrode elongation | Cell shape | Restrained | Electrode body type | Capacity retention rate |
| Example 1 | 1085-H18 | 2.2% | Cylindrical | No | Wound | 92% |
| Example 13 | 1085-H18 | 2.2% | Square | No | Wound | 96% |
| Example 14 | 1085-H18 | 2.2% | Square | Yes | Wound | 97% |
| Comp. Ex. 6 | 3003-H18 | 1.5% | Square | No | Wound | 81% |
| Comp. Ex. 7 | 3003-H18 | 1.5% | Square | Yes | Wound | 87% |
| Ref. Ex. 2 | 3003-H18 | 1.5% | Square | — | Stacked | 95% |

As Table 6 shows, the batteries of Examples 13 and 14, where a flat wound electrode body was used, exhibited a capacity retention rate of 96% or higher, and delivered a performance substantially identical to or better than that of the battery according to Example 1. The above revealed that the effect elicited by the feature of the present invention, namely preventing buckling of a wound electrode body by setting the tensile elongation at break to be 2% or higher, can also apply to flat wound electrode bodies.

In the battery of Comparative Example 7, which was restrained in such a manner that a predetermined pressure was exerted onto the wound electrode body, buckling of the wound electrode body is less likely to occur by virtue of the abovementioned restraining. Accordingly, the capacity retention rate after cycling exceeded 87% despite the fact that the tensile elongation at break of the positive electrode sheet was lower than 2%. This revealed that the effect elicited by the feature of the present invention, namely setting the tensile elongation at break to be 2% or higher, is particularly effective in batteries that are not restrained.

In the battery according to Reference Example 2, where a stacked-type electrode body was used, expansion and contraction in the sheet surface direction is freer than in the case of a wound type, and thus buckling of the electrode body is unlikelier to occur. Accordingly, the capacity retention rate after cycling exceeded 95% despite the fact that the tensile elongation at break of the positive electrode sheet was lower than 2%. This revealed that the effect elicited by the feature of the present invention, namely setting the tensile elongation at break to be 2% or higher, is particularly effective in batteries provided with a wound-type electrode body (wound electrode body).

As the results of the above examples show, it was possible to construct a lithium secondary battery having a high capacity retention rate after charge and discharge cycles, by prescribing the positive electrode sheet, the negative electrode Sheet and the separator sheet to all have a tensile elongation at break of 2% or higher. By virtue of such a feature, it becomes possible to realize a lithium secondary battery of high durability towards charge and discharge cycles. From the viewpoint of enhancing the cycle characteristic, the positive electrode sheet, the negative electrode sheet and the separator sheet have a tensile elongation at break that is appropriately 2% or higher, preferably 2.5% or higher, more preferably 3.0% or higher, yet more preferably 3.5% or higher and particularly preferably 4.0% or higher.

Preferred embodiments of the present invention have been explained above, but the present invention is not limited thereto, and, needless to say, may accommodate various modifications.

Figure 14:
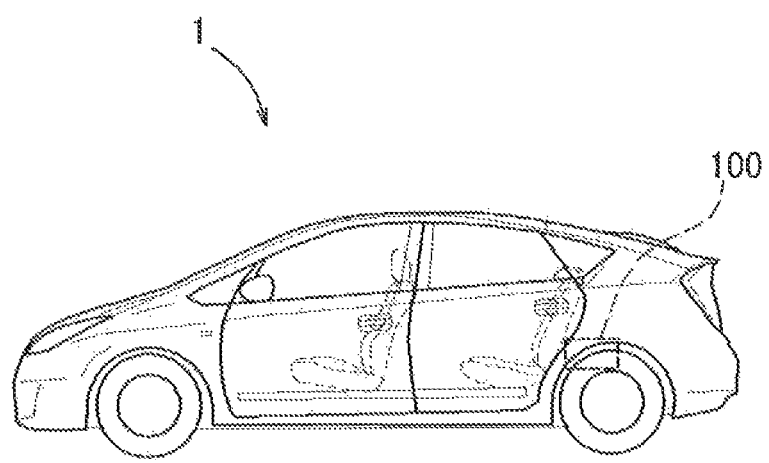
FIG. 14 is a side-view diagram illustrating schematically a vehicle provided with a nonaqueous electrolyte secondary battery according to an embodiment of the present invention.

Any of the nonaqueous electrolyte secondary batteries disclosed herein can deliver superior performance, in particular cycle durability, that is suitable for batteries installed in vehicles. Therefore, the present invention provides also a vehicle 1 that comprises any one of the nonaqueous electrolyte secondary batteries 100 disclosed herein (which may be in the form of a battery pack of nonaqueous electrolyte secondary batteries connected to each other) as illustrated in FIG. 14. In particular, the present invention provides a vehicle (for instance, an automobile) equipped with the above nonaqueous electrolyte secondary battery as a source of power (typically, a source of power in a hybrid vehicle or electric vehicle).

INDUSTRIAL APPLICABILITY

The present invention succeeds in providing a nonaqueous electrolyte secondary battery having high durability towards charge and discharge cycles.

The invention claimed is:

1. A nonaqueous electrolyte secondary battery, comprising:
    a nonaqueous electrolyte; and
    a wound electrode body configured by superposing on each other, and winding a positive electrode sheet having a positive electrode collector formed to a sheet shape and a positive electrode active material layer formed on that collector, a negative electrode sheet having a negative electrode collector formed to a sheet shape and a negative electrode active material layer formed on that collector, and a separator formed to a sheet shape,
    wherein a density of the positive electrode active material layer ranges from 2.3 to 2.7 g/cm$^3$,
    a density of the negative electrode active material layer ranges from 1.1 to 1.5 q/cm$^3$, and
    the negative electrode active material layer contains graphite as a negative electrode active material, the graphite is oriented in a predetermined direction, and the positive electrode sheet, the negative electrode sheet and the separator sheet all have a tensile elongation at break of 2% or higher.

2. The nonaqueous electrolyte secondary battery according to claim 1, wherein the tensile elongation at break of at least one of the positive electrode sheet and the negative electrode sheet is 4% or higher.

3. The nonaqueous electrolyte secondary battery according to claim 1, wherein the oriented negative electrode active material is graphite, and
    a peak intensity ratio of the (110) plane and the (004) plane of the graphite, by X-ray diffraction, is 0.5 or higher.

4. The nonaqueous electrolyte secondary battery according to claim 1, wherein the oriented negative electrode active material is oriented in a predetermined direction through magnetic orientation.

5. The nonaqueous electrolyte secondary battery according to claim 1, wherein the negative electrode collector is an electrolytic copper foil having a thickness of 10 μm or greater.

6. The nonaqueous electrolyte secondary battery according to claim 1, wherein the negative electrode sheet is formed by press-forming of the negative electrode active material layer onto the negative electrode collector, followed by a thermal treatment.

7. The nonaqueous electrolyte secondary battery according to claim 1, wherein the positive electrode collector is a JIS 1000-series or 8000-series aluminum foil.

8. The nonaqueous electrolyte secondary battery according to claim 1, wherein the positive electrode sheet is formed by press-forming of the positive electrode active material layer onto the positive electrode collector, followed by a thermal treatment.

9. The nonaqueous electrolyte secondary battery according to claim 1, further comprising an outer case having an inner space with a shape corresponding to that of the wound electrode body,
  wherein the wound electrode body is disposed in the inner space so as not to come into contact with an inner wall of the outer case.

10. The nonaqueous electrolyte secondary battery according to claim 1,
  wherein the positive electrode active material layer contains a lithium-nickel-cobalt-manganese-complex oxide as a positive electrode active material.

* * * * *